M. E. LAYNE.
WELL SCREEN.
APPLICATION FILED AUG. 29, 1911.
1,062,717.
Patented May 27, 1913.
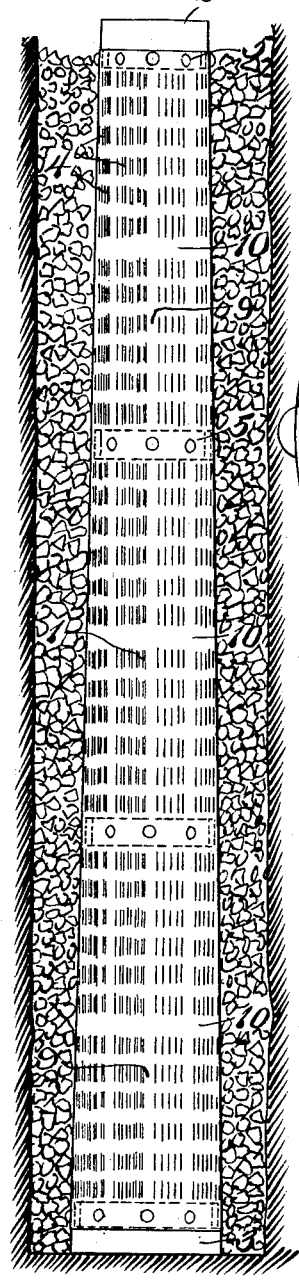
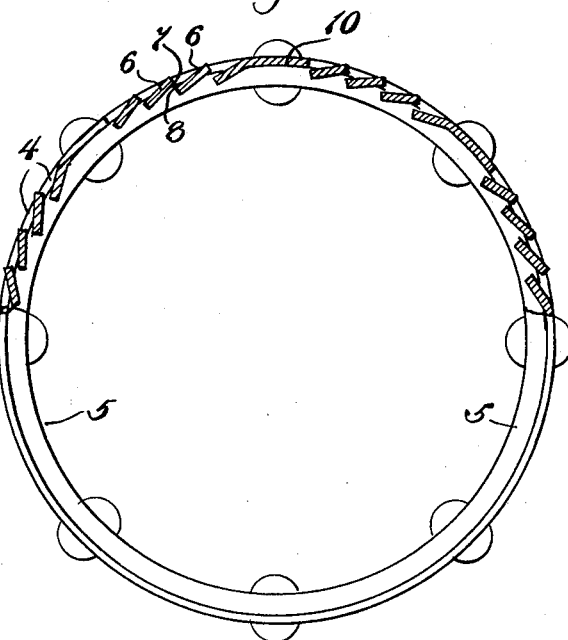
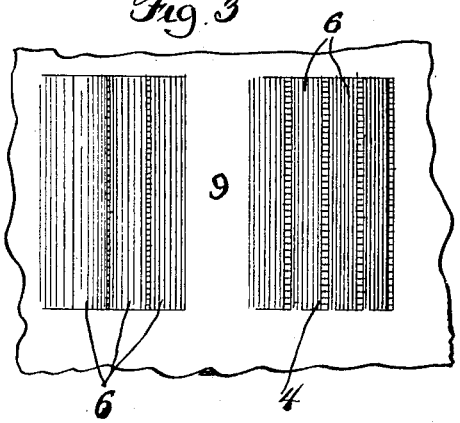

UNITED STATES PATENT OFFICE.

MAHLON E. LAYNE, OF HOUSTON, TEXAS.

WELL-SCREEN.

1,062,717. Specification of Letters Patent. Patented May 27, 1913.

Application filed August 29, 1911. Serial No. 646,955.

*To all whom it may concern:*

Be it known that I, MAHLON E. LAYNE, a citizen of the United States, residing at Houston, in the county of Harris and State of Texas, have invented certain new and useful Improvements in Well-Screens, of which the following is a specification.

The invention relates to well screens and has for its primary objects the provision of a screen having a maximum capacity; the provision of a screen of cheap and durable construction having a high efficiency; and the provision of a screen which may be easily positioned and which will not clog either during or after installation. One embodiment of the invention is illustrated in the accompanying drawing, wherein—

Figure 1 is a side elevation of a section of the screen on a reduced scale; Fig. 2 is a partial section and partial end elevation on a larger scale; and Fig. 3 is a side elevation on an enlarged scale of a portion of the screening surface.

The screen may be made from ordinary iron or steel tubing, or be made from sheet metal plates first punched and subsequently formed into tubular sections. The slits are formed by means of opposing serrated dies, one inside the tube and the other outside the tube, which dies on being brought toward each other shear out the slits and bend the strips of metal between the slits into the angular positions indicated in Fig. 2.

Referring to the drawings; 1 is the tube provided with the portions 2 and 3 for making connection with other tubular sections; 4 are the vertical screening slits, which may be grouped in the manner indicated in Fig. 2, or in any other desired way; and 5 are stiffening rings which are riveted upon the interior of the pipe.

The dies, used in the formation of the screen, punch or press out the strips of metal 6—6 (Fig. 2), so that the slit 4 therebetween is bounded by the inner edge 7 of the outer lip and the outer edge 8 of the inner lip, and as indicated in Fig. 3 the strips 6 are parallel to each other, so that the slits 4 are substantially the same width from their lower to their upper edges. In order to stiffen the tube, sections of metal 9 are left between the sets of slits, and other sections of metal 10 are left between the ends of such slits.

It will be noted that the screen section shown in Fig. 1 is larger at its lower end than at its upper end, thus providing a tapering tube, and this construction constitutes an important feature of my invention. This construction is advantageous in that it permits gravel to be placed around the screen and carried down therewith as it is forced into the ground. This gravel assists in filtration after the screen has been positioned, and the weight of the gravel pressing against the tapered sides of the screen assists in the operation of forcing the screen downwardly. The enlargement of the screen toward the bottom is also valuable as in most cases the most prolific water formations are found at the greater depth, and the flaring of the screen gives a large screening area at the point at which it is most effective. The fact that the gravel may be applied with this screen to serve as a supplemental screen, also permits the openings or slots in the screen to be made larger, which is advantageous if proper screening can be secured, inasmuch as the larger slots are not as subject to clogging as the smaller ones. The use of this form of tapering screen is further advantageous in that it permits the use of the screen in soil formations having a tendency to cave, in which under the ordinary conditions it would be necessary to case the well or else go to very considerable expense in providing other means to prevent caving. With the tapered screen, the gravel holds the surrounding earth from caving, and the screening surface is kept free from mud during the driving operation, so that there is no opportunity for the screen to fill up with dirt during its passage through unfavorable soil strata. It will be seen that the use of the gravel in connection with the tapered screen, permits of the use of a screening surface which might not otherwise be available were it not for the protection by the gravel and the screening afforded thereby, so that the invention so far as the tapered feature is concerned, is not limited to the use of a screen having vertical slots or slots formed in the manner indicated in Figs. 2 and 3.

It will be understood, insofar as the gravel supporting feature of the invention is concerned, that the only requirement is that the lower end of the tube be larger than the portion above, whereby the gravel employed may be supported and that the length of the enlarged portion may be varied to suit conditions. It will be further understood that the character of the screening means is immaterial in so far as the gravel supporting feature is concerned.

Having thus described my invention and illustrated its use, what I claim as new and desire to secure by Letters Patent is the following:—

A well screen comprising a perforated metal tube enlarged at its lower portion and adapted to support a loose screening material around the reduced portion of the tube above such lower portion, and a tubular envelop of loose screening material extending upward from the said enlarged portion and supported thereon and bearing at its inner surface against the tube and at its outer surface against the material in which the screen is located; the thickness of the walls of the tubular screening envelop being such that it may be inserted as the tube moves down during the positioning operation.

In testimony whereof I have hereunto signed my name in the presence of the two subscribed witnesses.

MAHLON E. LAYNE.

Witnesses:
L. L. LOTT,
H. C. SAVAGE.